US009213322B1

(12) United States Patent
Feng et al.

(10) Patent No.: US 9,213,322 B1
(45) Date of Patent: Dec. 15, 2015

(54) METHODS FOR PROVIDING RUN TO RUN PROCESS CONTROL USING A DYNAMIC TUNER

(75) Inventors: Jian-Huei Feng, San Jose, CA (US); Ming Jiang, San Jose, CA (US); Clayton R. Newman, Pleasanton, CA (US); Yeak-Chong Wong, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 553 days.

(21) Appl. No.: 13/587,754

(22) Filed: Aug. 16, 2012

(51) Int. Cl.
*G05B 13/02* (2006.01)
*G05B 13/04* (2006.01)

(52) U.S. Cl.
CPC ............ *G05B 13/024* (2013.01); *G05B 13/042* (2013.01)

(58) Field of Classification Search
CPC .. G05B 13/024; G05B 13/026; G05B 13/042; G05B 13/048
USPC ............... 700/28, 29, 32, 37, 44, 45, 95, 108, 700/109, 121
See application file for complete search history.

(56) References Cited

U.S. PATENT DOCUMENTS

| | | | |
|---|---|---|---|
| 5,111,404 A | 5/1992 | Kotani | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |

(Continued)

OTHER PUBLICATIONS

S. Butler and J. Stefani, "Supervisory Run-to-Run Control of Polysilicon Gate Etch Using In Situ Ellipsometry," IEEE Trans. Semiconduct. Manufact., vol. 7, No. 2, pp. 193-201, 1994.

(Continued)

*Primary Examiner* — Charles Kasenge

(57) ABSTRACT

Methods for providing run to run process control using a dynamic tuner are provided. Once such method includes receiving a data point for a process output parameter, determining whether the data point is within a desired range for the process output parameter, setting, when the data point is within the desired range, a dynamic lambda value equal to a preselected base lambda value, setting, when the data point is not within the desired range, the dynamic lambda value equal to a value based on the preselected base lambda value, a degree of difference between the data point and a target for the process output parameter, and a scale factor, calculating an exponentially weighted moving average using the dynamic lambda value, and adjusting the process control parameter in accordance with the exponentially weighted moving average.

14 Claims, 4 Drawing Sheets

(56) References Cited

U.S. PATENT DOCUMENTS

| | | |
|---|---|---|
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,366,822 B1 | 4/2002 | Heavlin |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |

(56) References Cited

U.S. PATENT DOCUMENTS

| | | |
|---|---|---|
| 6,704,158 B2 | 3/2004 | Hawwa et al. |
| 6,707,083 B1 | 3/2004 | Hiner et al. |
| 6,708,073 B1 | 3/2004 | Heavlin |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,757,579 B1 | 6/2004 | Pasadyn |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,961,636 B1 * | 11/2005 | Chong et al. ............... 700/121 |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,096,085 B2 * | 8/2006 | Paik ............................ 700/108 |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,181,355 B2 | 2/2007 | Kondo et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,221,990 B2 * | 5/2007 | Paik ............................ 700/109 |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,269,526 B2 | 9/2007 | Muro et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |

(56) References Cited

U.S. PATENT DOCUMENTS

| | | |
|---|---|---|
| 7,522,379 B1 | 4/2009 | Krounbi et al. |
| 7,522,382 B1 | 4/2009 | Pan |
| 7,542,246 B1 | 6/2009 | Song et al. |
| 7,542,880 B2 | 6/2009 | Good et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,672,739 B2 * | 3/2010 | Ganesan et al. ............. 700/29 |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,809,459 B2 | 10/2010 | Morisawa et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,914,657 B2 | 3/2011 | Fu et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,028,061 B2 | 9/2011 | Battisha et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,108,060 B2 * | 1/2012 | Tsen et al. ............. 700/108 |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,180,417 B2 | 5/2012 | Kim et al. |
| 8,180,471 B2 * | 5/2012 | Good et al. ............. 700/108 |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,224,475 B2 | 7/2012 | Tsai et al. |
| 8,225,488 B1 | 7/2012 | Zhang et al. |
| 8,227,023 B1 | 7/2012 | Liu et al. |
| 8,228,633 B1 | 7/2012 | Tran et al. |
| 8,229,588 B2 * | 7/2012 | Tsen et al. ............. 700/121 |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |

(56) References Cited

U.S. PATENT DOCUMENTS

| | | |
|---|---|---|
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,437,870 B2 | 5/2013 | Tsai et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,688,256 B2* | 4/2014 | Cheng et al. ............... 700/121 |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2007/0021263 A1 | 1/2007 | Moore et al. |
| 2007/0145010 A1 | 6/2007 | Lee et al. |
| 2007/0260346 A1* | 11/2007 | Ganesan et al. ............... 700/108 |
| 2008/0221831 A1 | 9/2008 | Wang |
| 2008/0299681 A1 | 12/2008 | Jaeger et al. |
| 2009/0018687 A1 | 1/2009 | Ishibashi et al. |
| 2009/0171638 A1 | 7/2009 | Morisawa et al. |
| 2010/0290157 A1 | 11/2010 | Zhang et al. |
| 2010/0305737 A1* | 12/2010 | Good et al. ............... 700/105 |
| 2011/0086240 A1 | 4/2011 | Xiang et al. |
| 2012/0029662 A1* | 2/2012 | Cheng et al. ............... 700/29 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

R. Guo, A. Chen, and J. Chen, "Chapter 19 an Enhanced EWMA Controller for Processes Subject to Random Disturbances," Run-to-Run Control in Semiconductor Manufacturing, edited by J. Moyne, E. del Castillo, and A. M. Hurwitz, CRC Press LLC, 2001.

(56) References Cited

OTHER PUBLICATIONS

Jian-Huei Feng, et al., U.S. Appl. No. 13/100,976, filed May 4, 2011, 15 pages.

NIST/SEMATECH, "e-Handbook of Statistical Methods," http://www.itl.nist.gov/div898/handbook/ pp. 18.

Park, et al., "Economic Design of a Variable Sampling rate EWMA chart", 2004, pp. 387-399.

Moyne, et al., "Run to Run control in Semiconductor Manufacturing chapters 18-19", 2000, pp. 31.

Chen, et al., "Age-Based Double EWMA Controller and Its Application to CMP Processes", IEEE Feb. 2001, pp. 11-19.

Aparisi, et al., "Design and Optimization of EWMA control charts for in-control, indifference, and out-of-control regions", Sep. 2005, pp. 2096-2108.

Fan, et al., "EWMA/SD: An End-Of-Line SPC Scheme to Monitor Sequence-Disordered Data", IEEE 1997, pp. 66-69.

Hunter, et al., "The Exponentially Weighted Moving Average", Oct. 1986, pp. 203-210.

Lucas, et al., "Exponentially Weighted Moving Average Control Schemes: Properties and Enhancements", Feb. 1990, pp. 1-12.

\* cited by examiner

| Tuner Type and Lambda settings | % of Data Points out of the desired Key Process Output Range | Wafer to Wafer Sigma |
|---|---|---|
| Simple EWMA Tuner (Fixed Lambda = 0.2) | 23.3 | 0.036 |
| Simple EWMA Tuner (Fixed Lambda = 0.45) | 16.6 | 0.029 |
| Simple EWMA Tuner (Fixed Lambda = 0.7) | 18.3 | 0.027 |
| Dynamic Tuner (Base lambda = 0.2, Dynamic lambda up to 0.7) | 10.0 | 0.026 |

METHODS FOR PROVIDING RUN TO RUN PROCESS CONTROL USING A DYNAMIC TUNER

FIELD

The present invention relates to manufacturing processes, and more specifically to methods for providing run to run process control using a dynamic tuner.

BACKGROUND

Run to run process control has been widely developed and utilized in different manufacturing industries where the processing conditions of next run are adjusted based on prior run results. A simple exponentially weighted moving average (EWMA) tuner is often adopted in the run to run process control system to estimate the deviation of model parameters. The simple EWMA tuner can be expressed using the formula:

$$P_{n+1} = \lambda \times R_n + (1-\lambda) \times P_n$$

where:
P=Process Control Parameter
R=Predicted Process Model Parameter based on Actual Data (e.g., new data point)
$\lambda$=EWMA weighing factor ($0<\lambda<1$)
n=nth run The EWMA weighing factor, lambda, is usually carefully selected for a process in order to get adequate process tuning. One such approach involves determining an optimum/fixed lambda value based on process capability index values and is described in U.S. Pat. No. 7,809,459 to Morisawa et. al. The simple EWMA tuner is usually quite effective to bring a process with moderate drifts under control, but may not be able to tune the process quick enough to address severe process shifts. Using a large fixed lambda value with the EWMA tuner as might be used in the Morisawa system could accelerate process tuning, but it does not allow for adjustment of the lambda value on the fly and thus introduces a high risk of process over-tuning.

A predictor corrector control scheme, which can also be referred to as a double EWMA controller, is proposed in an article by S. Butler and J. Stefani entitled, "Supervisory Run-to-Run Control of Polysilicon Gate Etch Using In Situ Ellipsometry," IEEE Trans. Semiconduct. Manufact., vol. 7, no. 2, pp. 193-201, 1994. In this predictor control scheme, a second EWMA tuner is used to compensate for the error incurred from the simple EWMA tuner, so extra tuning can be applied to the model control parameter when large process drifts occur. However, while this approach may be capable of adapting to small changes in process output, it is not well suited to adapting to high magnitude or short time interval type changes in process output.

Another approach that deals with both process drifts and process shifts at the same time has been proposed by R. Guo, A. Chen, and J. Chen, in a portion of a book entitled, "Chapter 19 An Enhanced EWMA Controller for Processes Subject to Random Disturbances," Run-to-Run Control in Semiconductor Manufacturing, edited by J. Moyne, E. del Castillo, and A. M. Hurwitz, CRC Press LLC, 2001. In the enhanced EWMA controller proposed by Guo, a baseline lambda is utilized to compensate for smaller process drifts. Two EWMA control charts are used as the detection tools for large and medium process shifts. If there is an out-of-control signal on the charts, a dynamic tuning loop is triggered and the lambda value is reset to a higher value. The lambda value is then decreased gradually over the next few runs, and eventually back to the baseline lambda. However, while this approach may be capable of some dynamic tuning using the control charts to tune to particular shifts, it is not well suited for rapid fluctuations in process output as the approach does not tune particularly fast.

Accordingly, an improved run to run control system that can address these shortcomings is needed.

SUMMARY

Aspects of the invention relate to methods for providing run to run process control using a dynamic tuner. In one embodiment, the invention relates to a method for providing run to run process control of a process control parameter using a dynamic tuner, the method including receiving a data point for a process output parameter, determining whether the data point is within a desired range for the process output parameter, setting, when the data point is within the desired range, a dynamic lambda value equal to a preselected base lambda value, setting, when the data point is not within the desired range, the dynamic lambda value equal to a value based on the preselected base lambda value, a degree of difference between the data point and a target for the process output parameter, and a scale factor, calculating an exponentially weighted moving average using the dynamic lambda value, and adjusting the process control parameter in accordance with the exponentially weighted moving average.

DETAILED DESCRIPTION

Figure 1:
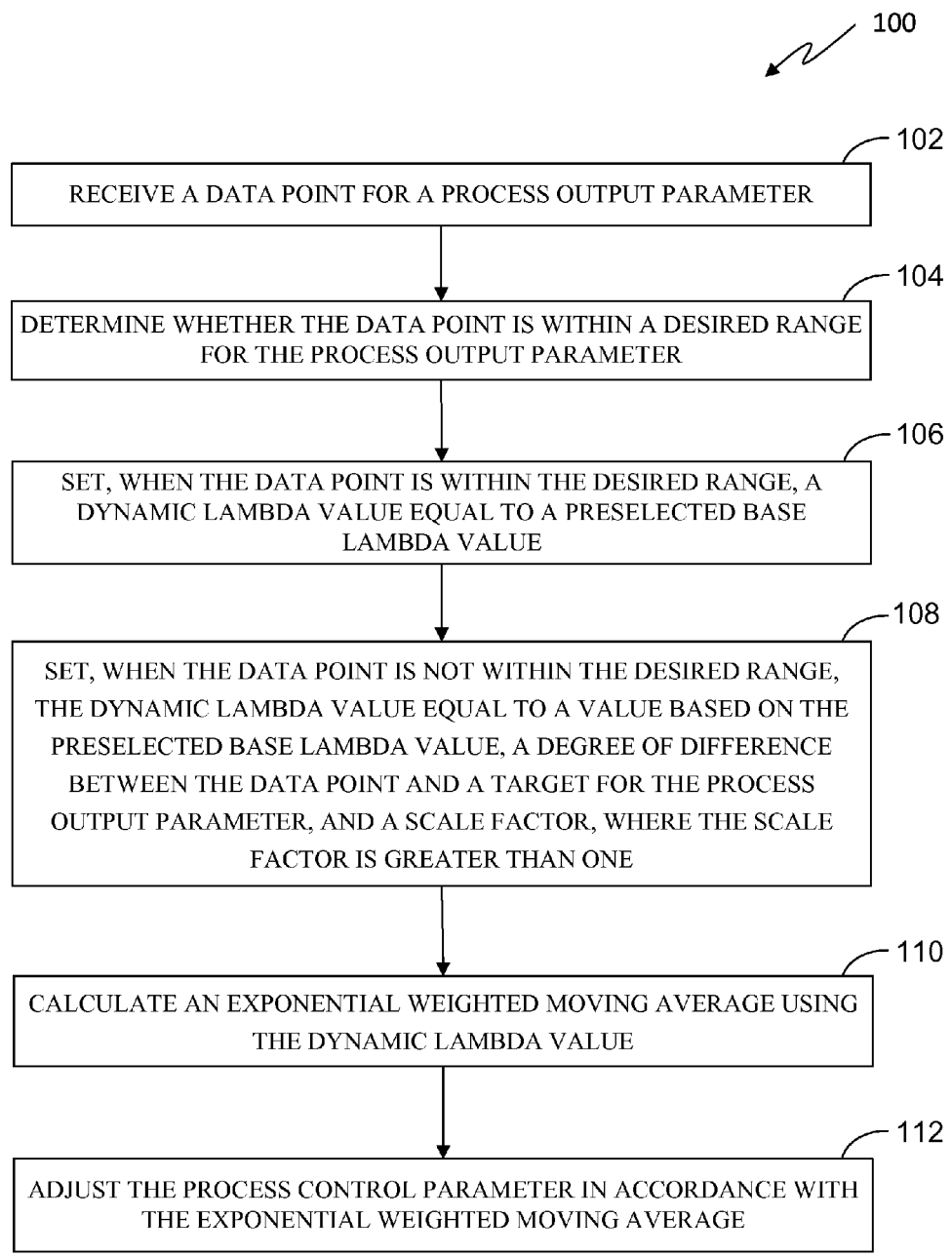
FIG. 1 is a flowchart of a general method for providing run to run process control of a process control parameter in accordance with one embodiment of the invention.

Referring now to the drawings, embodiments of processes for providing run to run process control of a process control parameter are illustrated. The processes apply an exponentially weighted moving average (EWMA) formula with a dynamic lambda to control a process parameter (e.g., process control parameter or process model parameter). When the process output parameter extends beyond a preselected/desired range, the dynamic lambda can have an aggressive value determined in part by a preselected scale factor and a degree to which the process output parameter extends beyond a target range. On the other hand, when the process output parameter is within the preselected/desired range, the dynamic lambda can have a less aggressive value (e.g., base lambda value) such as a preselected constant lambda value. The EWMA is then calculated using the dynamic lambda value and a process control parameter is adjusted in accordance with the calculated EWMA. The process can then repeat with a new data value, thereby enabling dynamic tuning.

FIG. 1 is a flowchart of a general process 100 for providing run to run process control of a process control parameter in accordance with one embodiment of the invention. The process first receives (102) a data point for a process output parameter (e.g., "key process output parameter", "just process output parameter" or "process output"). The process then determines (104) whether the data point is within a preselected or desired range for the process output parameter. The preselected/desired range can be defined by a preselected upper desired limit for the process output parameter and a preselected lower desired limit for the process output parameter.

The process then sets (106), when the data point is within the desired range, a dynamic lambda value equal to a preselected base lambda value. In several embodiments, when the data point is within the desired range, the process uses the base lambda value that corresponds to a less aggressive value than the value the process will use when the data point is beyond the desired range. The process then sets (108), when the data point is not within the desired range, the dynamic lambda value equal to a value based on the preselected base lambda value, a degree of difference between the data point and a target for the process output parameter, and a scale factor. The scale factor can be selected based on empirical data and a preselected degree of aggression that is desired for tuning the process control parameter to meet the target for the process output. In several embodiments, a higher scale factor corresponds to a higher degree of aggression. In several embodiments, the scale factor is selected to be greater than 0.

The target value of the process output is usually chosen based on process or device performance requirements. Different processes have different target values. After the target value is set for a process output, process control can be adjusted based on the target value, which is usually not changed unless the process or device performance requirements change.

The process then calculates (110) an exponentially weighted moving average (EWMA) using the dynamic lambda value. In several embodiments, the conventional formula for EWMA is used along with the dynamic lambda value to generate the EWMA output value. The process then adjusts (112) the process control parameter in accordance with the exponentially weighted moving average output value.

In one embodiment, the process control parameter can be a polishing rate, a deposition rate, an etch rate, an angle control for a material removal process, or a chemical mechanical planarization rate. In one embodiment, the process control parameter corresponds to a back pressure for a chemical mechanical planarization process. In other embodiments, the process control parameter can correspond to other control parameters of a manufacturing process. In several embodiments, the process control parameter can correspond to control parameters of a manufacturing process for magnetic transducers used in magnetic storage devices, including, for example sliders for hard disk drives.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 2:
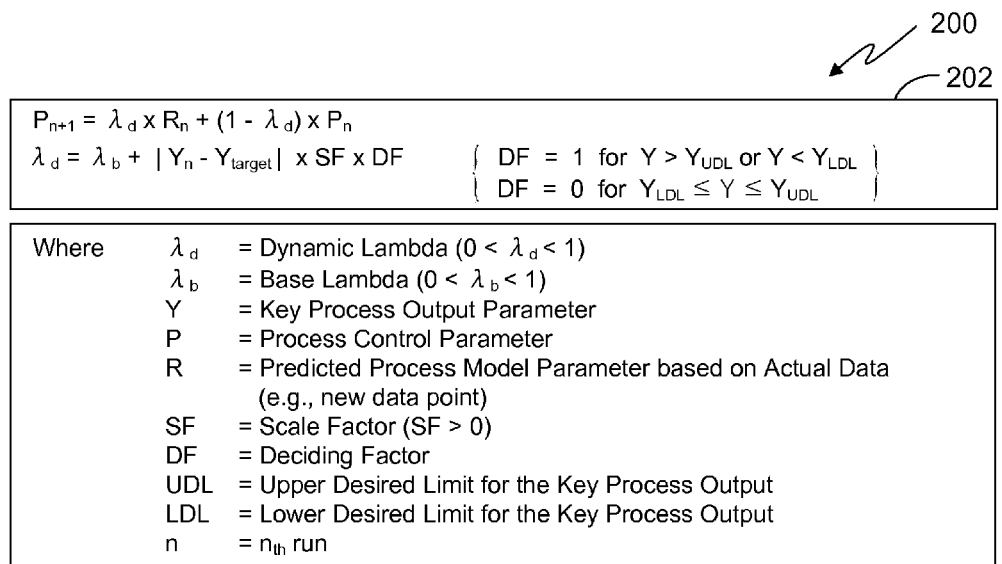
FIG. 2 is an illustration of an exponentially weighted moving average formula with a dynamic lambda that can be used to provide dynamic control of a process model/control parameter in accordance with one embodiment of the invention.

FIG. 2 is an illustration 200 of an exponentially weighted moving average formula with a dynamic lambda 202 that can be used to provide dynamic control of a process control parameter in accordance with one embodiment of the invention. In several embodiments, the formula 202 can be used in conjunction with the control processes of FIG. 1 or FIG. 3. The illustration 200 further includes a variable definition block 204 that provides definitions for each of the variables in the formula 202. While the expression in the formula 202 for the estimated process parameter (e.g., $P_{n+1} = \lambda_d \times R_n + (1-\lambda_n) \times P_n$) is a known formula for computing an exponentially weighted moving average, the use of a dynamic lambda value and the corresponding formula ($\lambda_d = |Y_n - Y_{target}| \times SF \times DF$) is not believed to be known in the art. As indicated in the variable definition block 204, the dynamic lambda and base lambda each are values between 0 and 1. The deciding factor (DF) is either 0 or 1 effectively acting as a switch between using the base lambda value (e.g., when the DF is 0) and the dynamic lambda (e.g., when the DF is 1) depending on whether the current/new value for the key process output parameter (Y) is within a desired range defined by a preselected upper desired limit (UDL) and a preselected lower desired limit (LDL).

In a number of embodiments, the scale factor (SF) is greater than 0. In some embodiments, the scale factor (SF) is greater than 1. In one embodiment, the scale factor (SF) is greater than 1 and less than 10. In other embodiments, other suitable values for the scale factor (SF) can be used. In several embodiments, a higher scale factor (SF) corresponds to a higher degree of aggression for tuning the process control parameter to meet the target of the process output. In one such embodiment, the scale factor (SF) is selected such that the dynamic lambda remains between 0 and 1. In another such embodiment, the scale factor (SF) is increased to compensate for a relatively low data point (e.g., maintain lambda between 0 and 1).

Figure 3:
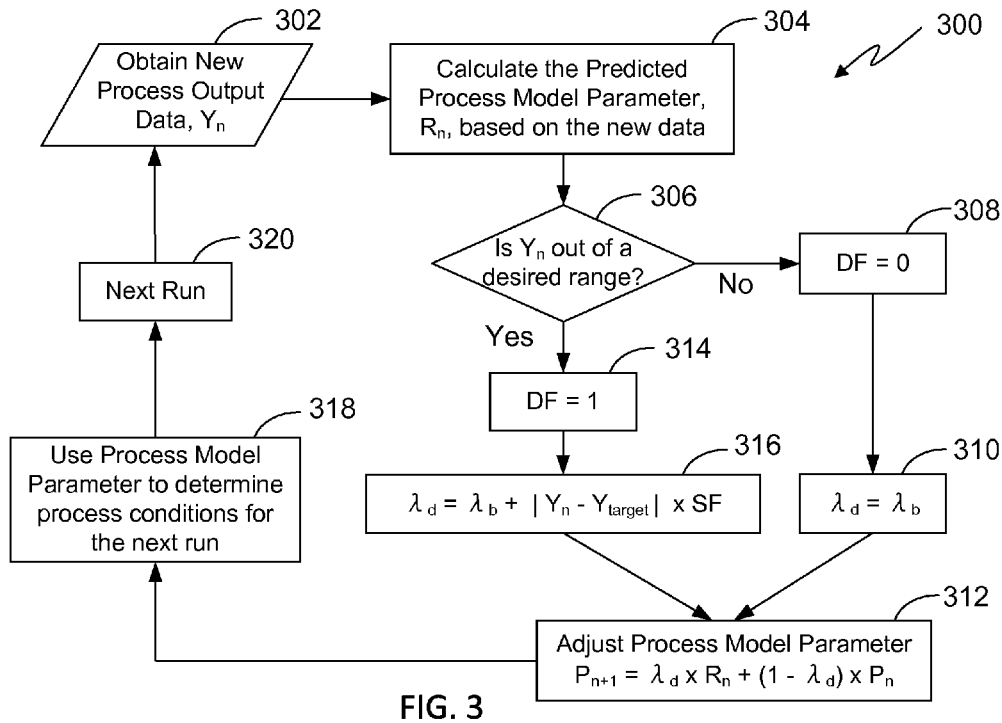
FIG. 3 is a flowchart of a particular method for providing run to run process control of a process model/control parameter using the dynamic tuning formula of FIG. 2 in accordance with one embodiment of the invention.

FIG. 3 is a flowchart of a particular process 300 for providing run to run process control of a process control parameter using the dynamic tuning formula 202 of FIG. 2 in accordance with one embodiment of the invention. The process can first obtain (302) a new process output parameter data (Yn). The process calculates (304) the predicted process model/control parameter, Rn, based on the new data (Yn). The process then determines (306) whether the new process output parameter data (Yn) is outside of a desired range. If the new process output parameter data (Yn) is not outside of the desired range, then the process sets (308) the deciding factor (DF) equal to 0 and as a result the dynamic lambda formula simplifies and the process sets (310) the dynamic lambda ($\lambda_d$) equal to the base lambda ($\lambda_b$). From block 310, the process adjusts (312) the process model/control parameter in accordance with the EWMA formula (e.g., $P_{n+1}=\lambda_d \times R_n+(1-\lambda_d) \times P_n$) and the dynamic lambda value.

On the other hand, if the new process output parameter data (Yn) is outside of the desired range, then the process sets (314) the deciding factor (DF) equal to 1 and calculates (316) the dynamic lambda ($\lambda_d$) according to the formula equal to the base lambda ($\lambda_b$) plus a value equal to the scale factor (SF) multiplied by the absolute value of the difference between the new process output parameter data (Yn) and a preselected target value for the process output parameter ($Y_{target}$). In such case, the process continues from block 316 and adjusts (312) the process model/control parameter in accordance with the EWMA formula (e.g., $P_{n+1}=\lambda_d \times R_n+(1-\lambda d) \times P_n$) using the calculated dynamic lambda value. From block 312, the process uses (318) the process model/control parameter to determine the process conditions for the next run/iteration of the process. The process then executes (320) the next run/iteration of the process by returning to block 302 to obtain new process output parameter data and thereby restarts the process.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
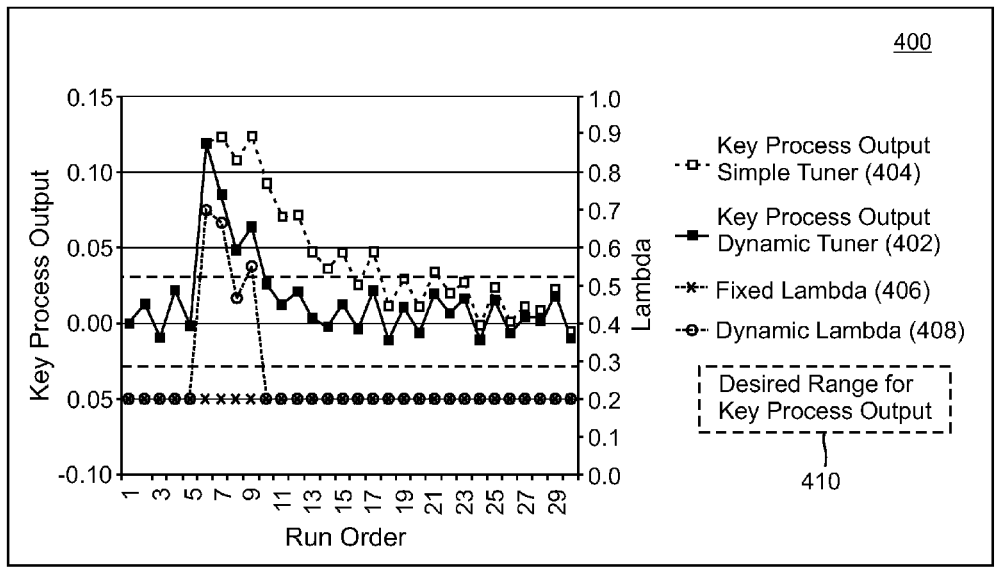
FIG. 4 is a graph illustrating the comparative performance of a dynamic EWMA tuner versus a simple EWMA tuner using a relatively low fixed lambda value for an example process output parameter that experiences a relatively severe process shift in accordance with one embodiment of the invention.

FIG. 4 is a graph 400 illustrating the comparative performance of a dynamic EWMA tuner 402 versus a simple EWMA tuner 404 using a relatively low fixed lambda value 406 for an example process output parameter that experiences a relatively severe process shift in accordance with one embodiment of the invention. As can be seen in FIG. 4, the fixed lambda value 406 is set at 0.2 (a relatively low value for the fixed lambda) while the dynamic lambda value 408 varies during the process and ranges from about 0.2 to about 0.7. The desired range 410 for the key process output parameter is marked on the graph with a box formed with dashed lines while the target for the key process output parameter is about 0.

Note that the severe process shift occurred at about run number 6, where the key process output parameter became much higher than the target, which is 0. Under the simple EWMA tuner 404 with the fixed lambda value of 0.2, the key process output did not go back to the desired range until about run number 18. However, using the dynamic EWMA tuner 402, where the base lambda was set also to be 0.2 and the dynamic lambda could go up to 0.7, the key process output was tuned back into the desired range at about run number 10, which is much faster than the simple EWMA tuner 404. The dynamic lambda 408 from run number 6 to run number 9 is higher than the base lambda 406 since the key process output is out of the desired range. The dynamic lambda values 408 for those runs also changed on the fly, depending on how far the key process output was away from the target. Once the key process output gets into the desired range, the dynamic tuner 402 uses the base lambda 406 to continue tuning the process closer to the target.

Figure 5:
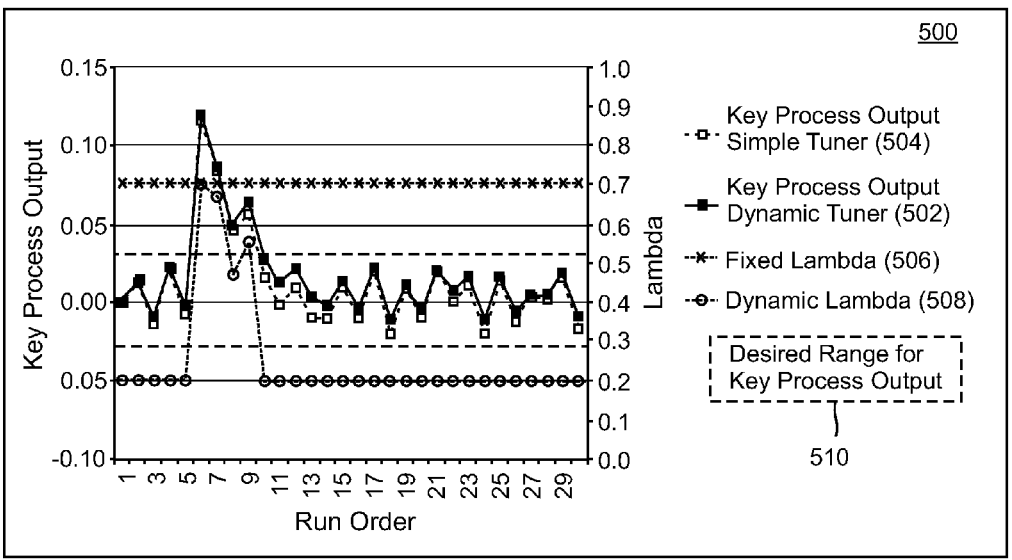
FIG. 5 is a graph illustrating the comparative performance of a dynamic EWMA tuner versus a simple EWMA tuner using a relatively high fixed lambda value for an example process output parameter that experiences the relatively severe process shift in accordance with one embodiment of the invention.

FIG. 5 is a graph 500 illustrating the comparative performance of a dynamic EWMA tuner 502 versus a simple EWMA tuner 504 using a relatively high fixed lambda value 506 for an example process output parameter that experiences the relatively severe process shift in accordance with one embodiment of the invention. As can be seen in FIG. 5 and as is distinguished from the simple EWMA tuner of FIG. 4, the fixed lambda value 506 is set at 0.7 (a relatively high value for the fixed lambda) while the dynamic lambda value 508 varies during the process in a range from about 0.2 to about 0.7. The desired range 510 for the key process output parameter is marked on the graph with a box formed with dashed lines while the target for the key process output parameter is about 0.

As mentioned above, using a large lambda value in the simple EWMA tuner could accelerate process tuning, but it also introduces a high risk of process over-tuning. FIG. 5 illustrates that when using a large fixed lambda value of 0.7 for the simple EWMA tuner in place of the relatively low fixed lambda of FIG. 4, the simple EWMA tuner 504 brings the key process output closer to the target quickly, similar to the dynamic tuner 502. However, when there is no severe process shift, the same simple EWMA tuner 502 will also over-tune the process output parameter.

Figures 6, 7:
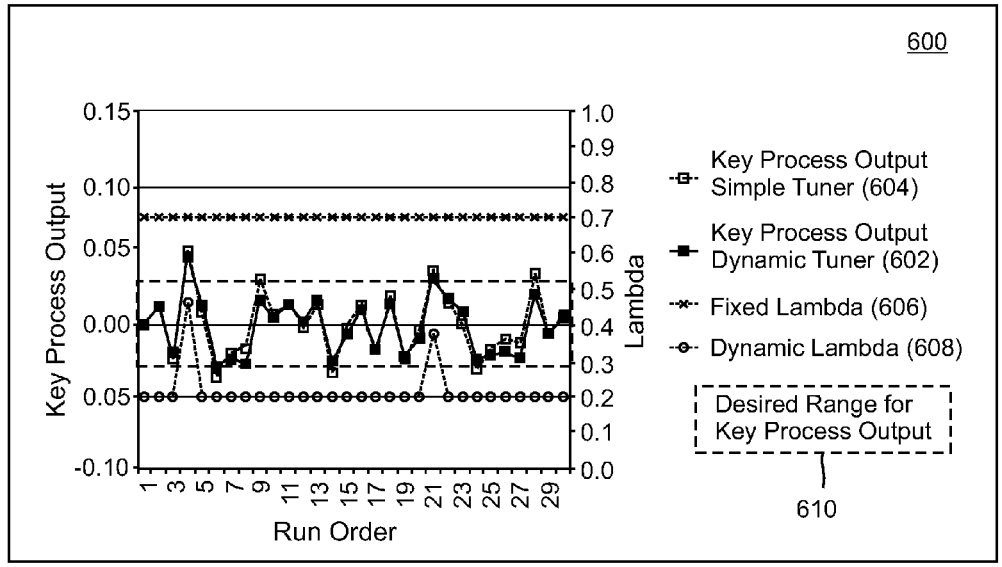
FIG. 6 is a graph illustrating the comparative performance of a dynamic EWMA tuner versus a simple EWMA tuner using a relatively high fixed lambda value for an example process output parameter without the relatively severe process shift of FIGS. 4 and 5 in accordance with one embodiment of the invention.
FIG. 7 is a table illustrating the comparative performance of a dynamic EWMA tuner versus a simple EWMA tuner using various lambda values, where the performance results include the number of data points that fell outside of the desired process output range and the resulting wafer to wafer sigma in accordance with one embodiment of the invention.

FIG. 6 is a graph 600 illustrating the comparative performance of a dynamic EWMA tuner 602 versus a simple EWMA tuner 604 using a relatively high fixed lambda value for an example process output parameter without the relatively severe process shift of FIGS. 4 and 5 in accordance with one embodiment of the invention. As can be seen in FIG. 6, the fixed lambda value 606 is set at 0.7 (a relatively high value for the fixed lambda) while the dynamic lambda value 608 varies during the process in a range from about 0.2 to about 0.7. The desired range 610 for the key process output parameter is marked on the graph with a box formed with dashed lines while the target for the key process output parameter is about 0.

As illustrated in FIG. 6, which is similar in regard to the graph of FIG. 5 except that the severe process shift has been removed, the simple EWMA tuner 604 using the relatively high fixed lambda value 606 can and does over-tune the process output parameter. More specifically, the key process output is outside of the desired range for a total of 7 runs when using the same simple EWMA tuner 604 with the fixed lambda value of 0.7 as was used in FIG. 5. On the other hand, when using the same dynamic tuner 602, only 2 runs were out of the desired range. The wafer-to-wafer sigma of the key process output using the dynamic tuner 602 was also lower than that of the simple EWMA tuner 604.

FIG. 7 is a table 700 illustrating the comparative performance of a dynamic EWMA tuner 702 versus a simple EWMA tuner 704 using various lambda values, where the performance results include the number of data points that fall outside of the desired process output range 706 and the resulting wafer to wafer sigma 708 in accordance with one embodiment of the invention. As can be seen from FIG. 7, the dynamic EWMA tuner 702 outperformed the simple EWMA tuner 704 despite the simple EWMA tuner 704 having used various fixed lambda values including 0.2, 0.45, and 0.7. More specifically, the dynamic EWMA tuner 702 had much fewer data points outside of the desired range than the simple EWMA tuner 704. Also, the dynamic EWMA tuner 702 had lower wafer to wafer sigma (e.g., wafer to wafer variation) than the simple EWMA tuner 704.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for providing run to run process control of a process control parameter using a dynamic tuner, the method comprising:
   receiving a data point for a process output parameter at a processor;

determining, by the processor, whether the data point is within a desired range for the process output parameter;

setting, by the processor, when the data point is within the desired range, a dynamic lambda value equal to a preselected base lambda value;

setting, by the processor, when the data point is not within the desired range, the dynamic lambda value equal to a value based on the preselected base lambda value, a degree of difference between the data point and a target for the process output parameter, and a scale factor;

calculating, by the processor, an exponentially weighted moving average using the dynamic lambda value;

adjusting, by the processor, the process control parameter in accordance with the exponentially weighted moving average to produce an adjusted process control parameter; and controlling a manufacturing device using the adjusted process control parameter.

2. The method of claim 1, further comprising calculating a predicted control process parameter based on the data point, wherein the calculating the exponentially weighted moving average using the dynamic lambda value comprises using the predicted process control parameter.

3. The method of claim 1, wherein the desired range is determined based on empirical data.

4. The method of claim 1, wherein the scale factor represents a preselected degree of aggression for tuning the process control parameter to meet the target for the process output parameter.

5. The method of claim 1, wherein a higher value for the scale factor corresponds to a higher degree of aggression for tuning the process control parameter to meet the target for the process output parameter.

6. The method of claim 1, wherein the scale factor is a number greater than 0.

7. The method of claim 1, wherein the process control parameter is selected from the group consisting of a polishing rate, a deposition rate, an etch rate, and an angle control for a material removal process.

8. The method of claim 1, wherein the process control parameter comprises a back pressure for a chemical mechanical planarization process.

9. The method of claim 1, wherein the setting, when the data point is not within the desired range, the dynamic lambda value comprises setting the dynamic lambda value equal to a first value of the preselected base lambda value plus an absolute value of the data point minus the target for the process output parameter where the first value is multiplied by the scale factor.

10. The method of claim 1, wherein the setting, when the data point is not within the desired range, the dynamic lambda value comprises decreasing the dynamic lambda value when a value, equal to an absolute value of the data point minus the target for the process output parameter, decreases.

11. The method of claim 1, wherein the setting, when the data point is not within the desired range, the dynamic lambda value comprises increasing the dynamic lambda value when a value, equal to an absolute value of the data point minus the target for the process output parameter, increases.

12. The method of claim 1, wherein the scale factor is selected based on a degree of difference between the data point and the target for the process output parameter such that the dynamic lambda value is greater than 0 and less than 1.

13. The method of claim 1, wherein the preselected base lambda value is greater than 0 and less than 1.

14. The method of claim 1, wherein the dynamic lambda value is greater than 0 and less than 1.

* * * * *